(12) United States Patent
Horovitz et al.

(10) Patent No.: US 10,400,989 B2
(45) Date of Patent: Sep. 3, 2019

(54) LAMP

(71) Applicants: Michael Horovitz, Brooklyn, NY (US); Reuven Natan Neta Horovitz, Spring Valley, NY (US)

(72) Inventors: Michael Horovitz, Brooklyn, NY (US); Reuven Natan Neta Horovitz, Spring Valley, NY (US)

( * ) Notice: Subject to any disclaimer, the term of this patent is extended or adjusted under 35 U.S.C. 154(b) by 0 days.

(21) Appl. No.: 15/671,189

(22) Filed: Aug. 8, 2017

(65) Prior Publication Data
US 2019/0049093 A1   Feb. 14, 2019

(51) Int. Cl.
| | | |
|---|---|---|
| *F21V 7/00* | (2006.01) | |
| *F21V 7/22* | (2018.01) | |
| *F21V 11/18* | (2006.01) | |
| *F21V 14/02* | (2006.01) | |
| *F21V 8/00* | (2006.01) | |
| *F21Y 101/00* | (2016.01) | |
| *F21S 43/14* | (2018.01) | |
| *F21S 43/239* | (2018.01) | |
| *F21S 43/249* | (2018.01) | |
| *F21S 43/243* | (2018.01) | |
| *F21Y 105/00* | (2016.01) | |
| *F21Y 103/10* | (2016.01) | |
| *F21Y 115/10* | (2016.01) | |

(52) U.S. Cl.
CPC ............. *F21V 7/0091* (2013.01); *F21V 7/22* (2013.01); *F21V 11/18* (2013.01); *F21V 11/186* (2013.01); *F21V 14/02* (2013.01); *F21S 43/14* (2018.01); *F21S 43/239* (2018.01); *F21S 43/243* (2018.01); *F21S 43/249* (2018.01); *F21V 2200/30* (2015.01); *F21Y 2101/00* (2013.01); *F21Y 2103/10* (2016.08); *F21Y 2105/00* (2013.01); *F21Y 2115/10* (2016.08); *G02B 6/0011* (2013.01); *G02B 6/0023* (2013.01); *G02B 6/0051* (2013.01); *G02B 6/0061* (2013.01); *G02B 6/0066* (2013.01); *G02B 6/0068* (2013.01); *G02B 6/0073* (2013.01)

(58) Field of Classification Search
CPC ... G02B 6/0091; G02B 6/0068; G02B 6/0021
See application file for complete search history.

(56) References Cited

U.S. PATENT DOCUMENTS

| | | | | |
|---|---|---|---|---|
| 1,920,826 A | * | 8/1933 | Wing | G09F 13/00 |
| | | | | 362/812 |
| 2,085,398 A | * | 6/1937 | Taaffe | G09F 13/00 |
| | | | | 40/437 |
| 2,347,665 A | * | 5/1944 | Christensen | F21S 8/00 |
| | | | | 359/652 |

(Continued)

*Primary Examiner* — Christopher Stanford
(74) *Attorney, Agent, or Firm* — AlphaPatent Associates, Ltd.; Daniel J. Swirsky

(57) ABSTRACT

A lamp, including: a plate, material thereof being optically transparent, the plate including two parallel surfaces and at least one rough width surface for illuminating outside the lamp; a plurality of illuminating sources disposed adjacent and along at least another width surface of the plate; and a user-movable shutter, for covering any of the plurality of illuminating sources, thereby the at least one rough width surface is uniformly illuminated, and thereby moving of the shutter adjusts intensity of the uniform illumination.

4 Claims, 4 Drawing Sheets

(56) References Cited

U.S. PATENT DOCUMENTS

| | | | | |
|---|---|---|---|---|
| 2,480,178 A * | 8/1949 | Zinberg | ............... | G02B 6/0005 |
| | | | | 362/263 |
| 2,722,762 A * | 11/1955 | Krajian | ................. | A63H 33/22 |
| | | | | 40/546 |
| 3,384,986 A * | 5/1968 | Davis | ................... | G02B 6/0048 |
| | | | | 40/546 |
| 3,486,261 A * | 12/1969 | Hardesty | ............. | G02B 6/0026 |
| | | | | 40/546 |
| 5,763,053 A * | 6/1998 | Amin | ....................... | B44F 1/06 |
| | | | | 428/105 |
| 8,956,038 B2 * | 2/2015 | Kusuura | ............. | G02B 6/0048 |
| | | | | 362/606 |
| 2002/0139023 A1 * | 10/2002 | Gianotti | .............. | G02B 6/0036 |
| | | | | 40/546 |
| 2008/0066356 A1 * | 3/2008 | Miller | ................ | G02B 6/0038 |
| | | | | 40/546 |
| 2013/0329459 A1 * | 12/2013 | Fisher | ................... | F21S 8/036 |
| | | | | 362/609 |

* cited by examiner

LAMP

TECHNICAL FIELD

The invention relates to the field of lamps. More particularly, the invention relates to a mechanical operable lamp.

BACKGROUND

There is a long felt need to provide a mechanical operable lamp, for providing uniform intensity.

SUMMARY

A lamp, including: a plate, material thereof being optically transparent; a plurality of illuminating sources; and a user-movable shutter, for covering any of the plurality of illuminating sources.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
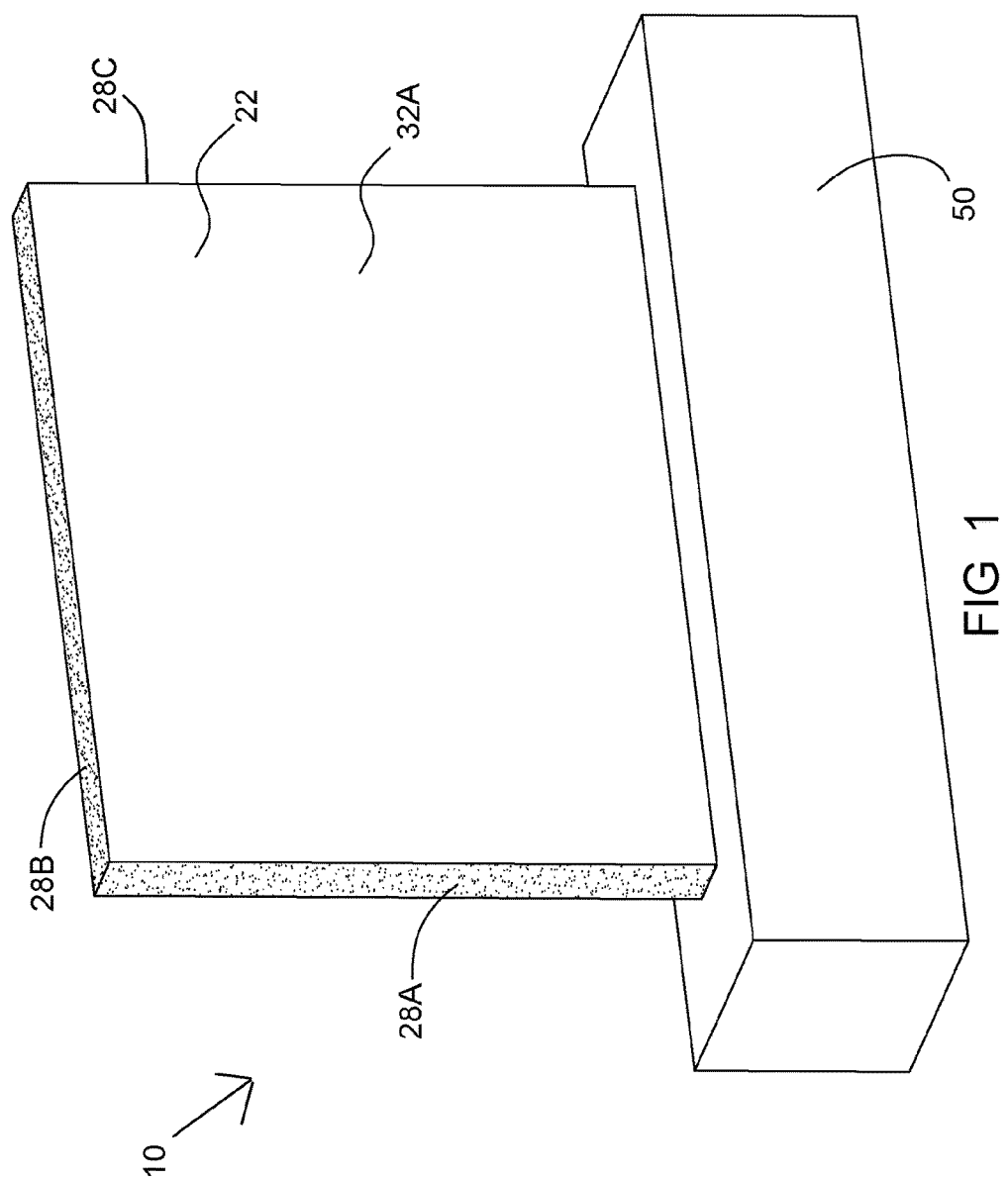
FIG. 1 is a front perspective view of a lamp according to one embodiment of the invention.

FIG. 1 is a front perspective view of a lamp according to one embodiment of the invention.

A lamp 10 includes a plate 22, material thereof being optically transparent; and an illuminating assembly 50, for illuminating plate 22.

The width surfaces 28A, 28B, 28C, etc. of plate 22 are rough, for obtaining dispersion therefrom, for obtaining uniform illumination therefrom.

Figure 2:
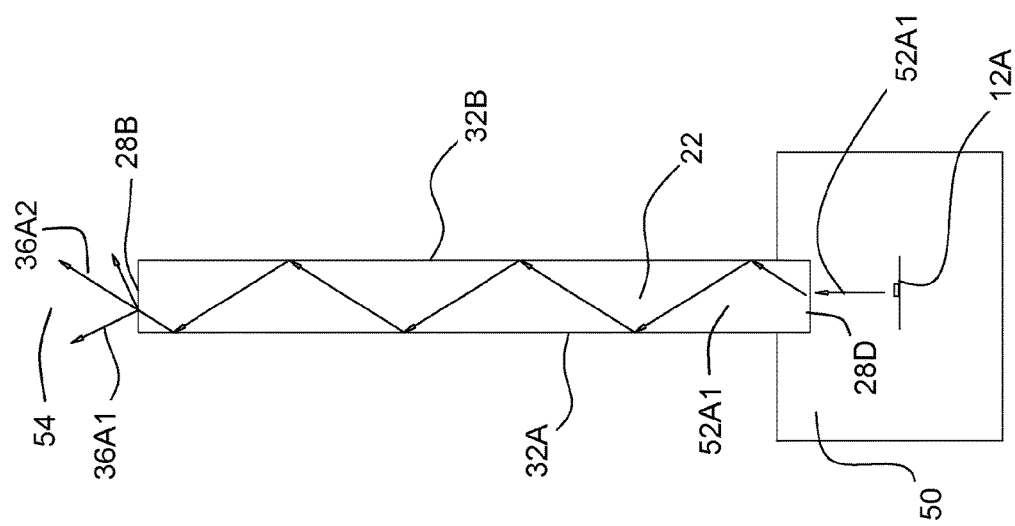
FIG. 2 is a side sectional view of the lamp of FIG. 1.

FIG. 2 is a side sectional view of the lamp of FIG. 1.

Illuminating assembly 50 includes illuminating sources 12A producing rays.

Plate 22 includes, except for width surfaces 28A, 28B, 28C, two parallel surfaces 32A and 32B. According to an embodiment of polished surfaces 32A and 32B, a ray 52A1 produced by illuminating source 12A, travels between parallel surfaces 32A and 32B by total internal reflection, until hitting top width surface 28B, thereby dispersing to rays 36A1 and 36A2 to the environment 54.

Figure 3:
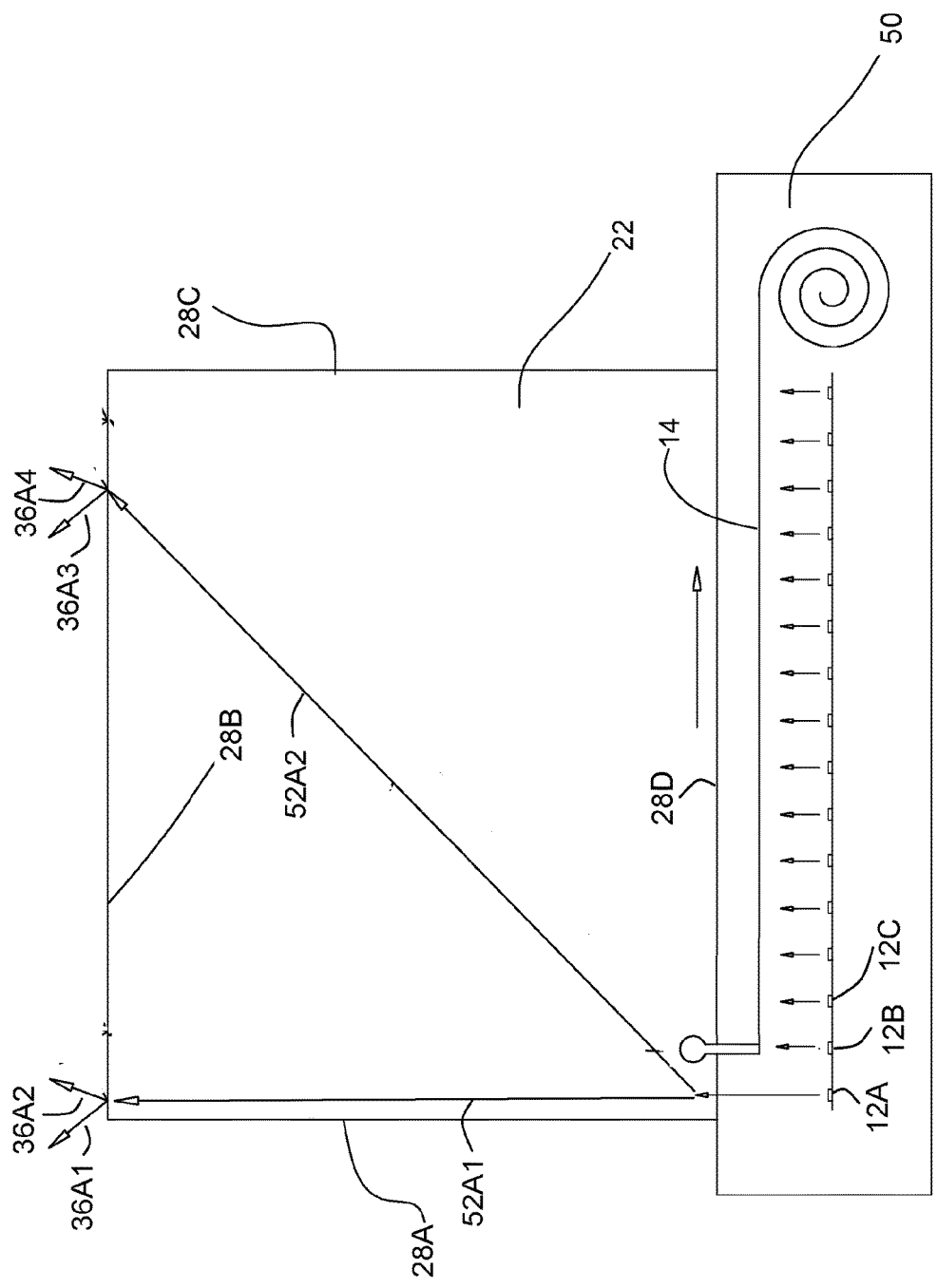
FIG. 3 is a side sectional view of the lamp of FIG. 1 at a first state.

FIG. 3 is a side sectional view of the lamp of FIG. 1 at a first state.

At the state of FIG. 3, a shutter 14 exposes illumination source 12A only; and covers illumination source 12B and all other disposed right to source 12A.

Ray 52A1 (described in FIG. 2) radiated from source 12A hits the left side of top width surface 28B, and is dispersed to rays 36A1 and 36A2. Another ray 52A2 as well being radiated from source 12A hits the right side of top width surface 28B, and is dispersed to rays 36A3 and 36A4.

It may be understood that source 12A illuminates the entire area of top width surface 28B, and that the illumination of the left side is not significantly larger than that of the center or of the right side, thus the intensity along top width surface 26B is substantially uniform.

Figure 4:
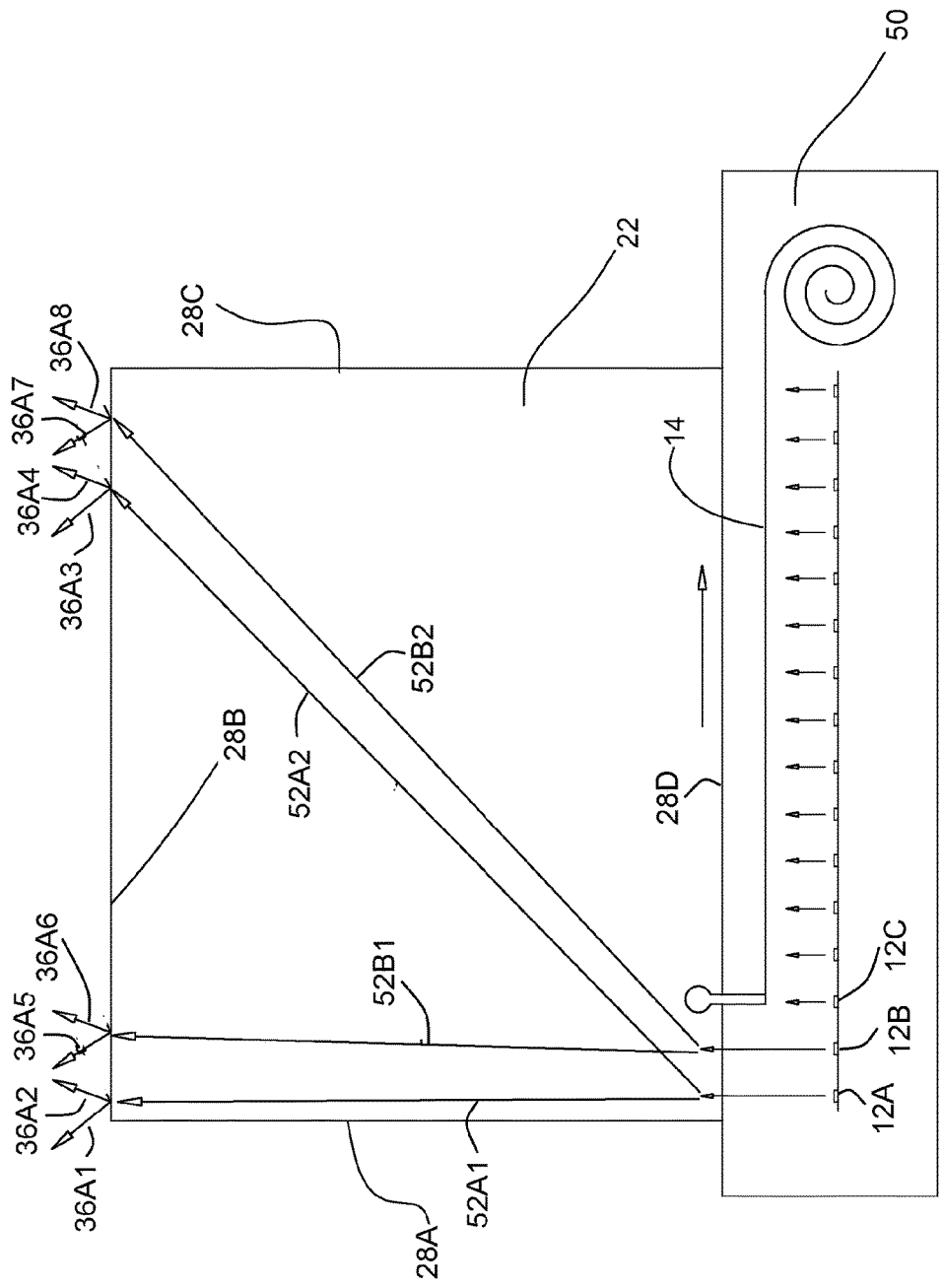
FIG. 4 is a side sectional view of the lamp of FIG. 1 at a second state.

FIG. 4 is a side sectional view of the lamp of FIG. 1 at a second state.

At the state of FIG. 4, shutter 14 exposes illumination sources 12A and 12B; and covers illumination source 12C and all other disposed right to source 12B.

Ray 52A1 (described in FIG. 3) radiated from source 12A hits the left side of top width surface 28B, and is dispersed to rays 36A1 and 36A2. Ray 52A2 (described in FIG. 3) radiated from source 12A hits the right side of top width surface 28B, and is dispersed to rays 36A3 and 36A4.

A ray 52B1 radiated from source 12B hits the left side of top width surface 28B, and is dispersed to rays 36A5 and 36A6. Ray 52B2 radiated from source 12B hits the right side of top width surface 28B, and is dispersed to rays 36A7 and 36A8.

It may be understood that not only source 12A, but also source 12B illuminates the entire area of top width surface 28B, and that the illumination of the left side is not significantly larger than that of the center or of the right side.

Thus, while by exposing source 12A only, top width surface 28B is illuminated by dispersed rays 36A1, 36A2, 36A3 and 364, being 4 rays only, by exposing source 12A and 12B, top width surface 28B is illuminated by dispersed rays 36A1, 36A2, 36A3, 36A4, 36A5, 36A6, 36A7 and 36A8, being 8 rays.

Thus, it may be understood that exposure of each source 12A, 12B, 12C, etc. multiplies the uniform intensity to each of width surfaces 28A, 28B and 28C.

Thus, in one aspect, the invention is directed to a lamp (10), including:
  a plate (22), material thereof being optically transparent, the plate (22) including two parallel surfaces (32A, 32B) and at least one rough width surface (28A, 28B) for illuminating outside (54) the lamp (10);
  a plurality of illuminating sources (12A, 12B, 12C) disposed adjacent and along at least another width surface (26D) of the plate (22); and
  a user-movable shutter (14), for covering any of the plurality of illuminating sources (12A, 12B, 12C),
thereby the at least one rough width surface (28A, 28B) is uniformly illuminated, and thereby moving of the shutter (14) adjusts intensity of the uniform illumination.

The two parallel surfaces (32A, 32B) of the plate (22) may be optically polished, thereby providing total internal reflection therealong.

The shutter (14) may constitute a roller shutter (56).

In the figures and/or description herein, the following reference numerals (Reference Signs List) have been mentioned:
  numeral 10 denotes the lamp according to one embodiment of the invention;

numerals 12A, 12B and 12C denote illumination sources, such as bulbs, or point leds;

numeral 14 denotes the shutter;

numeral 22 denotes the plate, being a light guiding plate;

numerals 28A, 28B, 28C and 28D denote width surfaces of the plate;

numeral 50 denotes the illuminating assembly;

numerals 52A1, 52A2, 52B1 and 52B2 denote rays travelling within the lamp;

numerals 36A1, 36A2, 36A3, 36A4, 36A5, 36A6, 36A7 and 36A8 denote rays illuminating to the environment outside the lamp;

numeral 54 denotes the environment;

numeral 56 denotes the roller, for rolling the shutter;

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A lamp, comprising:

a plate, material thereof being optically transparent, said plate comprising two parallel surfaces, being sufficiently near for providing total internal reflection therebetween, and at least one width surface, being perpendicular to said two parallel surfaces and being evenly rough substantially at an entire area thereof for uniformly illuminating therefrom outside said lamp;

a plurality of illuminating sources disposed for illuminating another width surface of said plate being perpendicular to said two parallel surfaces; and a user-movable shutter, disposed between said other width surface of said plate and selected illuminating sources of said plurality of illuminating sources, thereby said at least one rough width surface being perpendicular to said two parallel surfaces is uniformly illuminated for providing said illuminating outside said lamp, and thereby moving of said shutter adjusts intensity of said uniform illumination.

2. A lamp according to claim 1, wherein said two parallel surfaces of said plate are optically polished, thereby providing total internal reflection therealong.

3. A lamp according to claim 1, wherein said shutter comprises a roller shutter (56).

4. The lamp according to claim 1, wherein at least one of said least one rough illuminating surface is parallel to said other width surface of said plate.

* * * * *